United States Patent [19]

Herron et al.

[11] 4,248,647
[45] Feb. 3, 1981

[54] METHOD FOR PRODUCING ACOUSTICAL CEILING TILE FACED WITH A SMOOTH DISTORTION FREE DECORATIVE THIN PLASTIC FILM

[75] Inventors: Vincent P. Herron; Jay D. Shenk, both of Lancaster, Pa.

[73] Assignee: Armstrong Cork Company, Lancaster, Pa.

[21] Appl. No.: 64,569

[22] Filed: Aug. 7, 1979

[51] Int. Cl.³ .............................................. B29C 27/00
[52] U.S. Cl. ...................................... 156/84; 52/144; 52/145; 156/85; 156/219; 181/284; 181/291; 181/292; 181/293; 181/294; 181/296; 264/230; 264/293; 264/342 R
[58] Field of Search ................... 156/84, 85, 86, 219; 264/230, 342 R, 293; 181/284, 290, 291, 292, 293, 294, 296; 52/144, 145

[56] References Cited

U.S. PATENT DOCUMENTS

| | | |
|---|---|---|
| 1,582,564 | 4/1926 | Vredenburg ...................... 264/342 R |
| 2,802,764 | 8/1957 | Slayter et al. ......................... 181/291 |
| 3,771,213 | 11/1973 | Peraro ................................. 156/219 |
| 3,782,495 | 1/1974 | Nassof ................................. 181/291 |
| 3,848,043 | 11/1974 | Ganick et al. ....................... 264/293 |

*Primary Examiner*—Caleb Weston

[57] ABSTRACT

A method for producing an acoustical ceiling tile or panel faced with a distortion free decorative thin plastic film is accomplished by first embossing the acoustical base to form a picture frame surrounding a recessed area, stretching the thin decorative plastic film over the picture frame portion and adhesively securing the film to the side and/or back of the acoustical base and subsequenytly heat shrinking the film to produce a distortion free decorative surface.

4 Claims, 2 Drawing Figures

METHOD FOR PRODUCING ACOUSTICAL CEILING TILE FACED WITH A SMOOTH DISTORTION FREE DECORATIVE THIN PLASTIC FILM

BACKGROUND OF THE INVENTION

1. Field of the Invention

This invention relates to a method for producing an acoustical tile or panel faced with a distortion free decorative thin plastic film.

2. Description of the Prior Art

It is known to produce film covered acoustical tile by applying edge adhesive to acoustically punched boards and then covering the surface with a plastic film which is heat shrunk. A disadvantage in this method arises when the thin film comes in contact with the tile surface and any contaminants or surface irregularities are telegraphed through the film to distort it. It is also known to incorporate reflective sheet material such as aluminized polyester, in a stretched condition over a supporting frame to form, for example, mirror like reflective surfaces, see, for example, U.S. Pat. No. 3,733,116 and prior art set forth in column 1 for various constructions of such mirrors. The use of a special frame construction in combination with an acoustical base and a stretched metalized film is also known.

SUMMARY OF THE INVENTION

It is an object of this invention to provide a method for producing a decorative acoustical ceiling product provided with a smooth distortion free decorative thin plastic film, which method eliminates any need for providing special framing elements over which the film would be stretched during fabrication. In accordance with our invention, a standard acoustical base is embossed, in a platen press for example, to provide a picture frame surrounding a recessed area pressed into the base means of the press. When a decorative film is stretched over the picture frame and secured to the sides and/or back of the acoustical base, the film can then be heat shrunk to provide a smooth distortion free decorative surface which is maintained out of contact with the recessed portion of the embossed acoustical base.

DETAILED DESCRIPTION

The manufacture of embossed-in-register ceiling tile is disclosed in U.S. Pat. No. 3,848,043. Typically, ceiling tile products of the type referred to are conventionally formed on Fourdrinier or Oliver type machines and may be made primarily of mineral wool material such as described in U.S. Pat. No. 3,008,257 or made from a wood fiber stock. The board forming stocks conventionally contain other materials such as perlite and clay fillers as well as binders such as starch. Sheets are formed from the board stock continuously on the forming wire of the board forming machine from which excess water is drained. The sheet is further dewatered by passing it over vacuum means after which boards are cut from the sheet and dried in an appropriate oven. The dried boards are then cut into the size desired for the acoustical ceiling tile or panel, as the case may be.

Figure 1:
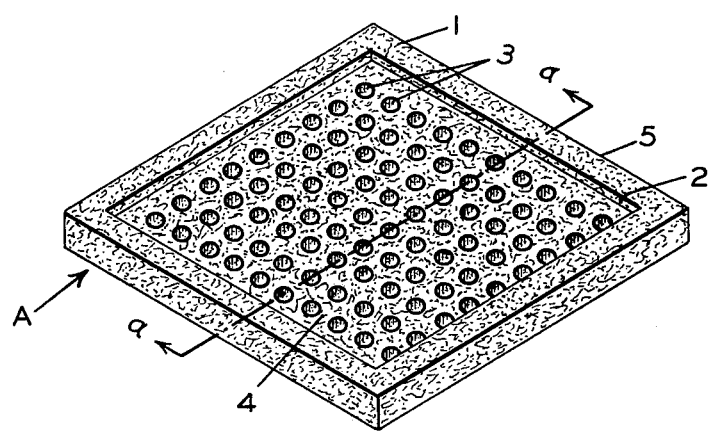
FIG. 1 is a perspective view illustrating an acoustical base embossed with a picture frame in accordance with this invention.
Figure 2:
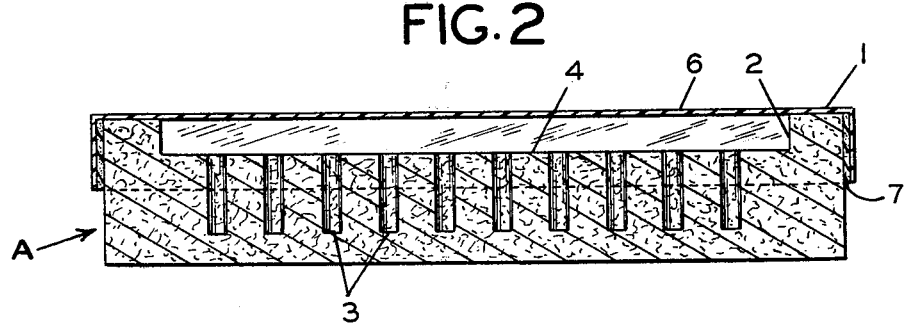
FIG. 2 is a across-sectional view along the line a—a of FIG. 1 additionally showing a heat shrunk decorative plastic film adhesively secured to the embossed acoustical base.

FIG. 1 is a perspective view illustrating a conventional ceiling tile A which has been cut to size and punched to form holes 3 which enhance its acoustical properties. The ceiling tile has been embossed in a press as disclosed in U.S. Pat. No. 3,848,043 in register with the edges 5 to provide the embossed configuration shown; in other words, with the picture frame portion 1 surrounding the recessed area 4 to a depth shown at 2 which is 0.030 inches (0.76 millimeters) or more. It is obvious that the size of the acoustical tile or panel is not critical to the practice of this invention although the tile illustrated in FIG. 1 is of conventional size, i.e., 2' by 2' (0.61 meters by 0.61 meters). In a preferred embodiment, the embossed tile A of FIG. 1 is sprayed with an adhesive which adheres to the sides of the tile as shown at 7 in FIG. 2.

A conventional neoprene based contact adhesive of the following formulation was sprayed onto the sides of the tiles as shown at 7.

| Ingredient | Parts by Weight (in grams) |
| --- | --- |
| Polychloroprene (E. I. duPont Neoprene AC) | 634 |
| Polychloroprene (E. I. duPont Neoprene WHV) | 320 |
| Magnesium Oxide (Merck and Co. Maglite D) | 132 |
| Zinc Oxide (Van Horn and Metz #46 Zinc Oxide) | 47.5 |
| Amorphous Silica (Hi Sil 233) | 94.5 |
| Butylphenol formaldehyde resin | 408 |
| Methyl ethyl ketone | 531 |
| Acetone | 992 |
| Zinc resinate (Reichhold Corp. Zirex) | 160 |
| Chlorinated natural rubber (Hercules Parlon S-10) | 94.5 |
| 2,2' methyulene bis 4 methyl 6 tert butylphenol | 18.2 |
| Hexane | 2040 |
| Water | 8.7 |

A decorative metalized plastic film 6 (3M Co. brushed silver Scotchpar 10BR2655) is stretched over the picture frame and adhered to the sides by means of the adhesive. The film faced tile is then heated at 400°–450° F. for about 1 minute to heat shrink the film and thus form a distortion free decorative film which is out of contact with the recessed acoustical base. As conventionally utilized, when a metal grid system is used to support the tile, the grid will serve to mask the embossed picture frame portion of the tile. Quite obviously, the width dimension of the frame is a matter of choice, the only requirement being that it support of metalized film in its stretching position and, preferably, be of a dimension less than the grid runner support.

Various manufacturers supply films which can be used in the practice of the invention. Most of these are based on polyester resins such as duPont Mylar polyester film made from polyethyleneteraphthalate. 3M Company manufactures brushed vacuum matalized polyester films under their trademark, Scotchpar. Decorative Mylar polyester films are commercially available from companies such as Coating Products, Inc. and Ludlow Packaging.

Generally speaking, vacuum metalized polyester films are preferred although recently attractive dyed polyester films have become available. The only critical requirements for the deocrative films which may be used in the practice of the invention are that their shrinkage on heating be between about 1.5 to 5% (measured at 150° C. for 30 minutes) and that their thickness be from about 0.0005 to 0.001 inches (0.01 to 0.025 millimeters).

What is claimed is:

1. A method of forming a decorative acoustical product comprising:
   (a) embossing an acoustical base in register to form an embossed picture frame coextensive with the edges of the base and surrounding a recessed area;
   (b) stretching a decorative plastic film over the picture frame and adhesively securing the film to the acoustical base; and
   (c) subjecting the film faced product to heat to shrink the film and thus stretch the film over the embossed picture frame out of contact with the recessed area to form a distortion free decorative film facing layer.

2. A method in accordance with claim 1 wherein the decorative plastic film is a polyester film having a thickness between 0.0005 and 0.001 inches and which shrinks from about 1.5 to 5 percent when heated at 150° C. for 30 minutes.

3. A method in accordance with claim 2 wherein the decorative film is a metalized film.

4. A method in accordance with claim 1, 2 or 3 wherein the recessed area is depressed about 0.030 inches or more below the embossed picture frame.

* * * * *